J. Lyle,
Saw-Set,
N° 57,044. Patented Aug. 7. 1866.
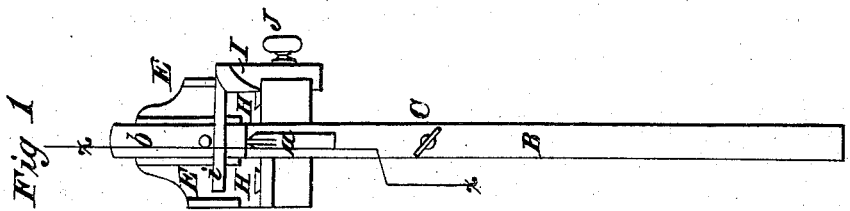
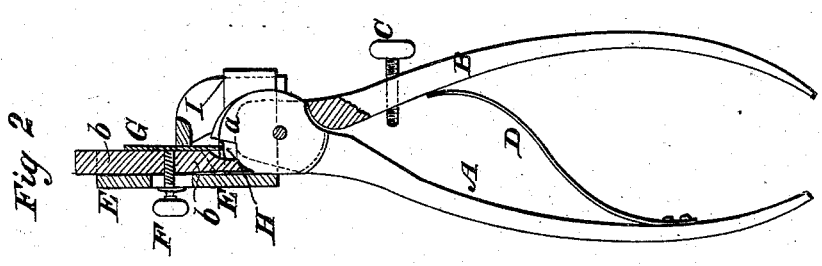
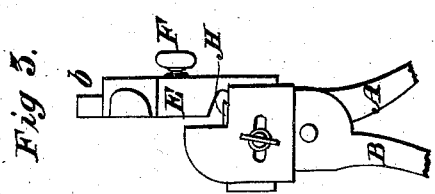
WITNESSES: INVENTOR:

UNITED STATES PATENT OFFICE.

JOHN LYLE, OF NEWARK, NEW JERSEY, ASSIGNOR TO HIMSELF AND COTTON H. ALLEN, OF SAME PLACE.

IMPROVEMENT IN SAW-SETS.

Specification forming part of Letters Patent No. 57,044, dated August 7, 1866.

*To all whom it may concern:*

Be it known that I, JOHN LYLE, of Newark, in the county of Essex and State of New Jersey, have invented a new and Improved Saw-Set; and I do hereby declare that the following is a full, clear, and exact description thereof, which will enable others skilled in the art to make and use the same, reference being had to the accompanying drawings, forming a part of this specification, in which—

Figure 1 is a top or plan view of my improved saw-set. Fig. 2 is a view of the left-hand side of Fig. 1, partly in section through the line $xx$. Fig. 3 is a view of the right-hand side of Fig. 1, the handles being broken off.

Similar letters of reference indicate like parts.

My invention has for its object the furnishing an improved saw-set by means of which a saw may be set much or little without the possibility of warping the blade or setting the teeth untrue, even though the tool be used by a boy or inexperienced workman; and it consists of a saw-set constructed and arranged as hereinafter more fully described.

A and B are the handles of the saw-set, which are pivoted to each other in the ordinary manner, the handle A terminating in a punch, $a$, which bends down or sets the saw-teeth by pressing them down over a shoulder formed on the bar $b$, in which the handle B terminates. C is a set-screw, by which the amount of set given to the saw-teeth may be regulated. D is a spring, by which the handles A and B are thrown apart, raising the punch $a$ from the saw-tooth after it has completed its work and the pressure has been removed from the said handles. E is an adjustable gage, secured to the bar $b$ by the set-screw F passing through a slot in said gage, and securing it to the said bar in the position required by the size of the teeth of the saw. The teeth of the saw G rest against the heads of the soft-metal bolts H, which are riveted to the upright part of the gage E, which prevents the teeth of the saw from being dulled by coming in contact with the hard-metal part of the saw-set. The upper face of the gage E is grooved or channeled, as shown in Figs. 1 and 3, for convenience in replacing the bolts H when required.

I is a guard secured to one side of the upright part of the gage E, and made adjustable by a set-screw, J, passing through a slot in said guard I, and having an arm, $i$, extending across the face of the gage E and bar $b$, as shown in Figs. 1 and 2. The object of this guard I $i$ is to hold the saw-blade always in the same position on the face of the bar $b$ and gage E while the teeth are being set, so that the blade may be kept from warping and the teeth may all have the same set.

By this tool, when the gage E has been arranged according to the size of the saw-teeth, the guard I $i$ according to the thickness of the saw-blade, and the set-screw C arranged so that the punch $a$ may give the desired set to the teeth, a boy or an unskillful workman can set a saw readily and correctly, giving to all the teeth the same set.

I claim as new and desire to secure by Letters Patent—

A saw-set constructed and arranged substantially as herein described, and for the purpose set forth.

The above specification of my invention signed by me this 2d day of January, 1866.

JOHN LYLE.

Witnesses:
JAMES T. GRAHAM,
M. M. LIVINGSTON.